United States Patent [19]

Gibbons

[11] Patent Number: 4,679,625
[45] Date of Patent: Jul. 14, 1987

[54] OIL RECOVERY PROCESS USING A VISCOSITY ADJUSTED GELATION SYSTEM

[75] Inventor: David L. Gibbons, Littleton, Colo.

[73] Assignee: Marathon Oil Company, Findlay, Ohio

[21] Appl. No.: 828,464

[22] Filed: Feb. 11, 1986

[51] Int. Cl.$^4$ .............................................. E21B 33/13
[52] U.S. Cl. .................... 166/270; 166/273; 166/274
[58] Field of Search ................ 166/270, 273, 274

[56] References Cited

U.S. PATENT DOCUMENTS

| | | | |
|---|---|---|---|
| 3,266,570 | 8/1966 | Gogarty | 166/9 |
| 3,502,146 | 3/1970 | Hurd | 166/270 |
| 4,009,755 | 3/1977 | Sandiford | 166/270 |
| 4,031,958 | 6/1977 | Sandiford et al. | 166/270 |
| 4,302,341 | 11/1981 | Watson | 252/8.55 R |
| 4,304,300 | 12/1981 | Watson | 166/291 |
| 4,332,297 | 6/1982 | Sandiford | 166/270 |
| 4,460,481 | 7/1984 | Schievelbein | 166/274 X |

*Primary Examiner*—Stephen J. Novosad
*Assistant Examiner*—Thomas J. Odar
*Attorney, Agent, or Firm*—Jack L. Hummel; Rodney F. Brown

[57] ABSTRACT

A gelation system for reducing the permeability of a subterranean region is provided by sequentially injecting slugs of a polymer solution and a crosslinking agent solution capable of crosslinking the polymer. The viscosity of the crosslinking agent solution is adjusted to facilitate mixing of the slugs in the desired treatment region to a form gel therein and minimize premature gelation outside of the treatment region.

21 Claims, No Drawings

OIL RECOVERY PROCESS USING A VISCOSITY ADJUSTED GELATION SYSTEM

BACKGROUND OF THE INVENTION

1. Technical Field

The invention relates to a process for reducing the permeability in a high permeability region of a subterranean hydrocarbon-bearing formation and more particularly to a process for improving conformance in the formation and improving flow profiles of fluids produced from or injected into a wellbore penetrating the hydrocarbon-bearing formation.

2. Description of Related Art

Poor vertical conformance results from the vertical juxtaposition of relatively high permeability geologic zones to relatively low permeability zones within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance.

Gelation system are commonly injected as sequential slugs into the high permeability regions of a formation exhibiting poor conformance in an effort to improve conformance and flow profiles of fluids therein. U.S. Pat. No. 4,031,958 to Sandiford, et al is typical of such processes wherein the gelation system is sequentially injected into the formation for the purpose of subsequently mixing in situ to form a gel. Sandiford et al and the like are unsatisfactory for the treatment of many formations because mixing and subsequent gelation occur prematurely without fully penetrating the treatment region. Viscosity differences between the sequential gel component slugs of the system promote fingering and rapid mixing of the gel component. Gelation generally occurs at the point of mixing, which can be far ahead of the desired treatment region, especially where the region is a substantial distance from the wellbore. Once the gel forms, it is often unable to penetrate the formation further and permeability reduction is not effected in the desired treatment region.

A process is needed for inhibiting mixing of sequentially injected gel component slugs until the slugs have fully penetrated the desired treatment region. A process is further needed for minimizing premature gelation of a gelation system. A process is needed wherein regions a substantial distance from the wellbore can be treated effectively by a gelation system which gels in situ.

SUMMARY OF THE INVENTION

The present invention provides a process for improving vertical and areal conformance in a subterranean hydrocarbon-bearing formation penetrated by a wellbore and for correspondingly improving flow profiles and sweep efficiencies of injected and/or produced fluids in the formation. The process utilizes a gel system compromising sequentially injected slugs of discrete gel components. The viscosities of the slugs are adjusted to facilitate mixing of the gel components in the desired treatment region and inhibit premature mixing in regions where little or no permeability reduction is desired.

The gel system includes one or more slugs of a crosslinkable polymer solution and one or more slugs of a crosslinking agent solution capable of crosslinking the polymer. A viscosifier which does not substantially react with the crosslinking agent is added to the crosslinking agent solution. The relative viscosities of the crosslinking agent slug and the polymer slug determine the point of in situ mixing and gel formation. Thus, by predetermining the location and volume of the desired treatment region, and accordingly adjusting the viscosity of the crosslinking agent slug relative to the polymer slug, the practitioner can place a gel in the desired region.

The process is particularly applicable to treatment of regions which are a substantial distance from a wellbore. It is often advantageous to reduce permeability in far wellbore as well as near wellbore environments because fluids can bypass a limited near wellbore treatment volume negating any flow profile and comformance improvement. The present process can fully penetrate an extended treatment region and achieve effective permeability reduction therein.

The present process further minimizes undesirable premature mixing of the gel component slugs in or near a wellbore by properly adjusting the viscosity of the slugs. If the viscosity of the slugs is substantially different and is not adjusted, fingering and subsequent gelation can occur before it is desired. Once the gel sets up, it may be extremely difficult if not impossible to displace into the treatment region and little or no permeability reduction is effected in the desired treatment region.

DESCRIPTION OF A PREFERRED EMBODIMENT

The present invention utilizes a gel system comprising sequentially injected discrete slugs of a crosslinkable polymer and a crosslinking agent capable of crosslinking the polymer. The slugs mix and form a gel in situ. Useful polymers include water-soluble synthetic and biopolymers, such as polyacrylamide, partially hydrolyzed polyacrylamide and polysaccharide. The polymers may be in a fresh water or brine solution.

Advantageous crosslinking agents include multivalent metal cations such as $Fe^{2+}$, $Fe^{3+}$, $Al^{3+}$, $Ti^{4+}$, $Zn^{2+}$, $Sn^{4+}$, $Ca^{2+}$, $Mg^{2+}$, or $Cr^{3+}$. The multivalent metal cation may be present at the above-stated valence state, at a higher valence state coupled with a reducing agent such as a $Cr^{6+}$/sulfite system, or complexed with a retarding anion such as an $Al^{3+}$/citrate system.

The viscosity of the polymer solution is generally a function of the molecular weight properties of the polymer and the polymer concentration in solution. The viscosity of the polymer solution is selected to achieve a predetermined rate and depth of penetration of the treatment region in a manner known in the art and described in U.S. Pat. No. 4,433,727 to Argabright et al, incorporated herein by reference. Penetration of treatment regions of increasing permeability is usually increased by reducing the concentration or molecular weight of the given polymer in solution.

In most cases the viscosity of the crosslinking agent solution is lower than the viscosity of the polymer solution because of their differing molecular weight properties. This condition may cause undesirable fingering between the crosslinking agent slug and the polymer slug before they enter the treatment region. To counteract this, a viscosifier is added to the crosslinking agent slug to adjust the viscosity thereof such that the slugs penetrate the formation at substantially the same rate to substantially the same depth. These conditions minimize mixing between the two slugs and subsequent gelation until they are placed in the desired treatment region.

The viscosifying agent is advantageously unreactive with the crosslinking agent. Suitable agents may be nonionic water-soluble polymers or surfactant systems. Exemplary polymers include polyvinyl alcohol, methyl cellulose, hydroxyethyl cellulose, hydroxypropyl cellulose, and ethylene and propylene oxide block polymers. Of these, hydroxylethyl cellulose, which is marketed under the tradename of NATROSOL 250 HHR by Hercules Inc., 910 Market Street, Wilmington, Del. 19899, U.S.A. is preferred. Surfactant systems include a surfactant in combination with an ethoxylated alcohol or an ethoxylated sulfate.

The present process is applicable to the treatment of high permeability zones in communication with injection wells wherein the high permeability zones divert injected displacement fluids from less permeable oil-bearing zones. Reducing the permeability of high permeability zones enables one to inject displacement fluids into lower permeability oilbearing zones and recover the oil therefrom. The treatment is effective for plugging larger anomalies in communication with injection wells such as fractures, streaks and vugs which network away from the wellbore. The process is also applicable to treatment of regions in communication with production wells. The permeability of regions in communication with production wells is reduced to inhibit the production of displacement fluids or connate water from the well and correspondingly increase oil production.

By adjusting the viscosity of the injected fluids, treatments can be designed over a range of penetration depths starting at the wellbore face up to a maximum treatment depth of about 400 ft from the wellbore into which the treatment fluids are injected. The relative viscosity of the slugs which enables them to penetrate the treatment region to a desired depth can be determined by means such as laboratory core flooding noted in U.S. Pat. No. 4,433,727 to Argabright et al.

The gel component slugs are injected sequentially into a wellbore in fluid communication with the treatment region and displaced therein. Zone isolation may be practiced to facilitate placement of the slugs into the treatment region. Zone isolation means include the use of packers, perforated casing, perf balls and the like.

The injection sequence may employ any number of repetitive injections of slugs necessary to achieve a desired degree of treatment. The slug volumes are advantageously tapered when a sequence of multiple slugs are injected into the treatment region. Liquid spacers may be placed between the gel component slugs to provide even greater penetration of the formation but are not essential to the practice of the present process. The size of the spacer is a function of the treatment depth, e.g., large pore volume spacer provides deeper penetration. A typical spacer is on the order of about 2 percent by volume of the gel component slug immediately preceding the spacer.

The injection rate is below a rate at which significant shearing of the polymer occurs. Reducing the injection rate can enable deeper penetration of the region.

Once the gel components are in place in the treatment region, a shut-in time is advantageously provided to enable complete mixing and gelation of the components therein. The shut-in time should be at least long enough to form a gel which does not migrate into regions outside the treatment region. Where the treatment region is subjected to extreme conditions such as production drawdown pressure, it is desirable to allow essentially complete gelation before resuming production so that little or no gel is produced from the well. Shut-in times can range from none at all to about 4 weeks, depending upon the gelation rate and the specific in situ gelation conditions.

The following example demonstrates the practice and utility of the present invention but is not to be construed as limiting the scope thereof.

EXAMPLE

A high permeability zone in fluid communication with an injection wellbore has a permeability of 2000 md and is bounded by lower permeability oil-bearing zones having a permeability of 200 md. It is desired to reduce the permeability of the high permeability zone to less than that of the lower permeability zones for a depth of 100 ft from the wellbore face.

Experimental core floods indicate that a partially hydrolyzed polyacrylamide solution having a concentration of about 1500 ppm and a viscosity of about 200 cp is capable of providing the required penetration into the treatment zone.

A partially hydrolyzed polyacrylamide solution is prepared in a fresh water solvent having the predetermined concentration and viscosity stated. A crosslinking agent solution is prepared containing about 3000 ppm $Na_2Cr_2O_7.2\ H_2O$, and 3000 ppm $NaHSO_3$. The viscosity of the crosslinking agent solution is increased to about 200 cp by the addition of NATROSOL 250 HHR.

Thereafter the polymer and crosslinking agent slugs are injected into the wellbore in the following tapered sequence separated by aqueous spacers:

Injection Sequence

5% pv polymer
0.1% pv spacer
5% pv crosslinking agent
0.1% pv spacer
2.5% pv polymer
0.1% pv spacer
2.5% pv crosslinking agent
0.1% pv spacer
1.25% pv polymer
0.1% spacer
1.25% pv crosslinking agent Upon completion of the injection sequence, the wellbore is shut-in for 48 hours. The permeability of the treatment zone is reduced to about 100 md, while substantially no permeability reduction is detected in the adjacent oil-bearing zones. The wellbore is returned to operation as an injection well and a displacement fluid, such as water or an aqueous polymer solution, is injected into the wellbore to displace oil from the oil-bearing zones into a production well and to the surface.

While the foregoing preferred embodiments of the invention have been described and shown, it is understood that alternatives and modifications, such as those suggested and others, may be made thereto and follow in the scope of the invention.

I claim:
1. A process for recovering oil from a subterranean oil-bearing formation penetrated by a wellbore and having a high permeability region bounded by at least one lower permeability region comprising the steps of:

preparing a crosslinkable polymer solution having a predetermined viscosity such that said solution is capable of penetrating said high permeability region at a predetermined rate to a predetermined depth;

providing a crosslinking agent in a solution capable of crosslinking said polymer, said crosslinking agent solution having a viscosity substantially less than said predetermined viscosity of said polymer solution;

adjusting the viscosity of said crosslinking agent solution by the addition of a viscosifying agent in an amount sufficient to raise the viscosity of said crosslinking agent solution substantially equal to that of said polymer solution such that said crosslinking agent solution is capable of penetrating said high permeability region at a rate and to a depth substantially equal to said predetermined rate and depth of said polymer solution and wherein said viscosifying agent is substantially unreactive with said crosslinking agent;

sequentially injecting a slug of said polymer solution and a slug of said crosslinking agent solution into said wellbore in fluid communication with said high permeability region;

displacing said sequentially injected slugs into said high permeability region such that said slugs penetrate said high permeability region at said predetermined rate;

substantially mixing said slugs at said predetermined depth in said high permeability region;

crosslinking said polymer with said crosslinking agents to form a crosslinked polymer gel which substantially reduces the permeability of said high permeability region; and recovering oil from said formation.

2. The process of claim 1 wherein said wellbore is an injection wellbore.

3. The process of claim 2 wherein oil is recovered from said formation by means of a displacement fluid injected into said at least one lower permeability region via said injection wellbore.

4. The process of claim 1 wherein said wellbire is a production wellbore.

5. The process of claim 4 wherein oil is recovered from said formation via said production wellbore.

6. The process of claim 1 wherein said viscosifying agent is a water-soluble nonionic polymer.

7. The process of claim 6 wherein said water-soluble nonionic polymer is selected from the group consisting of polyvinyl alcohol, methyl cellulose, hydroxyethyl cellulose, hydroxypropylcellulose, ethylene oxide block polymers and propylene oxide block polymers.

8. The process of claim 1 wherein said polymer comprises acrylamide.

9. The process of claim 8 wherein said polymer is a partially hydrolyzed polyacrylamide.

10. The process of claim 1 wherein the crosslinking agent comprises a multivalent metal cation.

11. A process for substantially reducing the permeability of a high permeability region in a subterranean hydrocarbon-bearing formation bounded by at least one lower permeability region comprising the steps of:

providing a crosslinkable polymer in a solution having a predetermined viscosity and a crosslinking agent in a solution capable of crosslinking said polymer, said crosslinking agent solution having a viscosity substantially less than said predetermined viscosity of said polymer solution;

adjusting the viscosity of said crosslinking agent solution by the addition of a viscosifying agent in an amount sufficient to raise the viscosity of said crosslinking agent solution substantially equal to that of said polymer solution and wherein said viscosifying agent is substantially unreactive with said crosslinking agent;

sequentially injecting a slug of said polymer solution and a slug of said crosslinking agent solution into a wellbore in fluid communication with said high permeability region;

displacing said sequentially injected slugs into said high permeability region, the viscosity of said crosslinking agent solution adjusted relative to said predetermined viscosity of said polymer solution such that said slugs substantially mix in said high permeability region to form a crosslinked polymer gel which substantially reduces the permeability of said high permeability region.

12. The process of claim 11 wherein said viscosifying agent is a water-soluble nonionic polymer.

13. The process of claim 11 wherein said viscosifying agent comprises a surfactant and an ethoxylated alcohol or sulfate.

14. The process of claim 12 wherein said water-soluble nonionic polymer is selected from the group consisting of polyvinyl alcohol, methyl cellulose, hydroxyethyl cellulose, hydroxypropyl cellulose, ethylene oxide block polymers and propylene oxide block polymers.

15. The process of claim 11 further comprising repeating the sequential injection of said slugs at least once.

16. The process of claim 11 further comprising separating said sequentially injected slugs by a spacer substantially unreactive with said slugs.

17. The process of claim 11 further comprising shutting in said wellbore for a period of time sufficient to substantially form said gel.

18. The process of claim 11 wherein said polymer comprises acrylamide.

19. The process of claim 18 wherein said polymer is a partially hydrolyzed polyacrylamide.

20. The process of claim 11 wherein the crosslinking agent comprises a multivalent metal cation.

21. The process of claim 20 wherein said multivalent metal cation is a chromium ion.

* * * * *

UNITED STATES PATENT AND TRADEMARK OFFICE
CERTIFICATE OF CORRECTION

PATENT NO. : 4,679,625

DATED : July 14, 1987

INVENTOR(S) : David L. Gibbons

It is certified that error appears in the above–identified patent and that said Letters Patent are hereby corrected as shown below:

Col. 3, line 23: Delete "oilbearing" and insert --oil-bearing--.
Col. 5, line 35: Delete "crosslinking agents" and insert --crosslinking agent--.
Col. 5, line 45: Delete "wellbire" and insert --wellbore--.

Signed and Sealed this

Twenty-fourth Day of November, 1987

Attest:

DONALD J. QUIGG

Attesting Officer

Commissioner of Patents and Trademarks